UNITED STATES PATENT OFFICE.

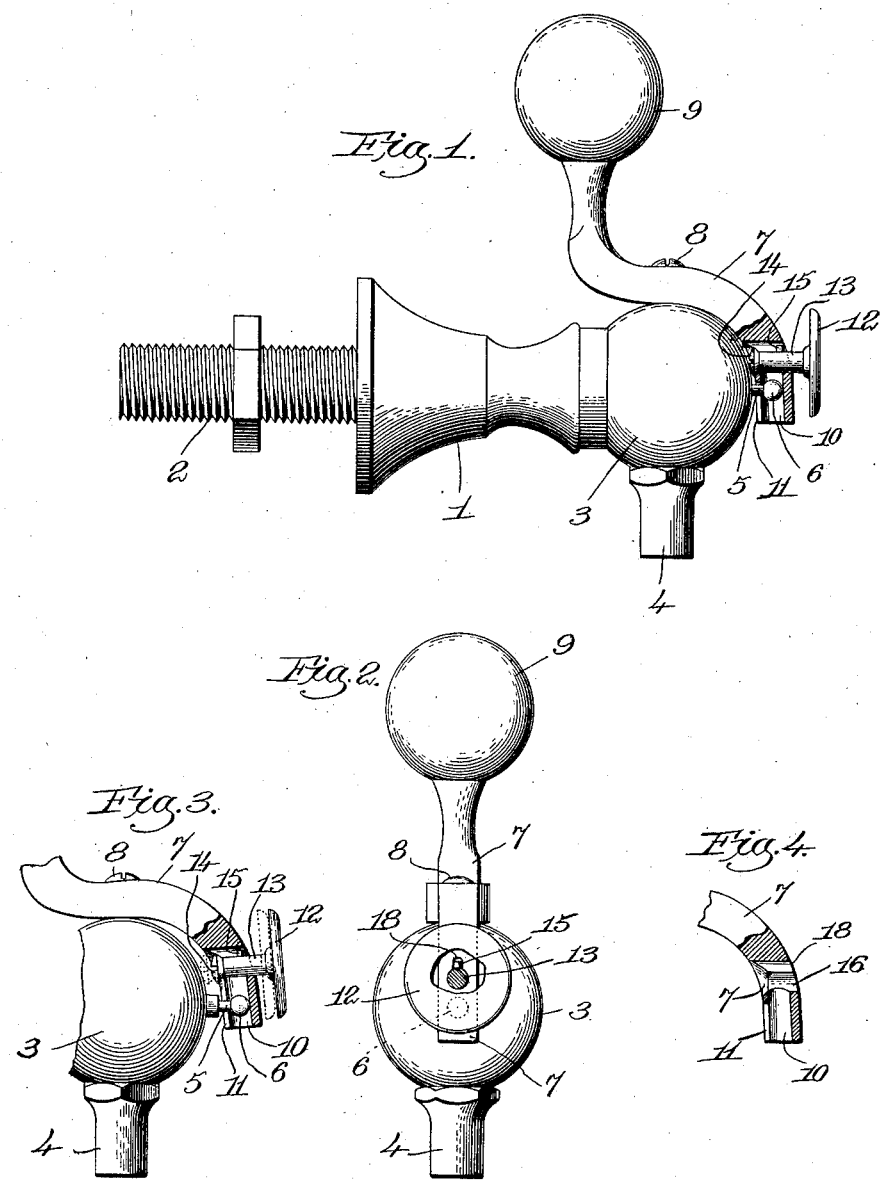

THEODORE G. STRATER, JR., OF WEST TISBURY, MASSACHUSETTS, ASSIGNOR TO HERMAN STRATER & SONS, OF BOSTON, MASSACHUSETTS, A FIRM.

TAP OR FAUCET.

1,034,043.          Specification of Letters Patent.          Patented July 30, 1912.

Application filed February 9, 1912. Serial No. 676,548.

*To all whom it may concern:*

Be it known that I, THEODORE G. STRATER, Jr., a citizen of the United States, and resident of West Tisbury, county of Dukes, State of Massachusetts, have invented an Improvement in Taps or Faucets, of which the following description, in connection with the accompanying drawing, is a specification, like characters on the drawing representing like parts.

This invention relates more particularly to taps or faucets for dispensing beer or similar beverages, of the type wherein the opening and closing movement of the valve is effected by the manual operation of a handle pivotally mounted on the faucet casing and having its free depending end operatively connected with the stem of the valve. Taps or faucets of this type are in extensive use, and it has been found that at times when the attendant is moving about he will accidentally strike the depending end of the handle with his arm or body and move it toward the casing, thereby opening the valve and causing waste of the liquid through the opened faucet.

My present invention has for its object the production of a simple and efficient guard for such faucets, so arranged that it projects frontward beyond the depending end of the handle and receives any accidental blow, protecting the handle therefrom and obviating any movement thereof to open the faucet. Herein I have shown the guard as mounted loosely upon the depending end of the handle, movable with the latter and also relatively thereto, the relative movement of the guard if struck when the faucet is closed being limited by engagement with the casing and preventing opening movement of the handle.

The various novel features of my invention will be fully described in the subjoined specification and particularly pointed out in the following claims.

Figure 1 is a side elevation of a well known form of tap or faucet with one embodiment of my invention applied thereto, the depending end of the handle, in valve-opening position, being shown partly in section; Fig. 2 is a front elevation of the faucet and guard, the head of the latter being broken out; Fig. 3 is a detail in side elevation, similar to Fig. 1, but showing the handle in normal position, that is, when the valve is closed; Fig. 4 is a detail in section of the depending end of the handle.

Referring to the drawing, the casing 1 having a threaded shank 2 and valve chamber 3 provided with a discharge nozzle 4, the longitudinally movable valve-stem 5 having a spherical head 6, and the handle 7 pivotally connected by a stud 8 with the casing to rock thereon, are and may be all of well known construction. The upturned end of the handle is provided with a suitable hand-grip 9, and the depending end of said handle is curved downward over the valve chamber 3, the handle at its lower end having a recess 10 for the head 6 and a slot 11 for the valve-stem 5, making a species of ball and socket connection between the handle and valve-stem.

Referring to Fig. 3, to open the faucet the hand-grip 9 is drawn forward and thereby the depending end of the handle 7 is moved from the position shown in Fig. 3 to that shown in Fig. 2, forcing the valve-stem inward and unseating the usual valve (not shown). Opposite movement of the hand-grip restores it and the handle to the position shown in Fig. 3, to thereby close the faucet, and referring to said figure it will be seen that at such time the depending end of the operating handle 7 is held away from the adjacent part of the valve chamber 3. Now if this lower end of the handle is struck accidentally and moved thereby toward the casing the valve will be opened and the liquid will be discharged through the nozzle 4. To prevent such accidental opening of the faucet I have provided a guard for the handle, and herein the guard is shown as comprising a disk-like head 12 and a spindle 13 preferably screwed thereinto, the opposite end of the spindle having an enlargement 14, and said spindle is also provided with a short radial lug or pin 15.

Referring to Fig. 4 the lower end of the handle has a hole 16 drilled therethrough above the recess 10, for the reception loosely of the spindle 13, the rear end of the hole being flared at 17 to receive the enlargement 14, and the radial pin 15 enters loosely a groove 18 at the upper part of the hole 16.

From Figs. 2 and 3 it will now be apparent that the guard is supported by the lower end of the handle 7 and that it is movable therewith and also relatively thereto, the enlargement 14 preventing withdrawal of the guard while the pin 15 prevents rotative movement thereof, the disklike head 12 being sustained upright in front of the handle end and spaced therefrom. Now, with the parts as shown in full lines, Fig. 3, if the attendant moves past the faucet he cannot accidentally strike the depending end of the handle, for if he approaches the faucet near enough to strike anything the head 12 of the guard will be struck and the guard will be pushed rearward, relatively to the handle, into dotted line position, Fig. 3. This movement of the guard is limited by the engagement of the enlargement 14 with the valve chamber 3, and at such time the head 12 is still a short distance away from the end of the handle, so that no movement will be imparted thereto. The guard may receive a hard blow or knock, but it effectually protects the handle from the impact thereof under all circumstances.

Ordinarily the opening movement of the handle will position the guard as shown by full lines, Fig. 3, but whether or not the guard assumes this position it will at all times be positioned to protect the handle from a chance blow or push.

If desired the head 12 of the guard can be used to display the name or brand of some particular beverage, or such other advertising matter as may be desired, the pin 15 moving in the groove 18 serving to prevent any rotation of the head and thereby maintaining any lettering thereon in proper upright position.

The construction of the guard is very simple, it can be readily applied to faucets of the type referred to, and it effectually prevents the annoying waste due to accidental opening of the faucet.

Various changes or modifications in details of construction and arrangement may be made by those skilled in the art without departing from the spirit and scope of my invention as set forth in the annexed claims.

Having fully described my invention, what I claim as new and desire to secure by Letters Patent is:

1. The combination with a faucet having a rocking, manually operated handle, and a valve-stem connected with one end of said handle, of a guard having a part thereof in front of and spaced from such end of the handle, to take up the impact of a knock or blow and prevent transmission thereof to the adjacent end of the handle, to thereby prevent accidental opening of the faucet, said guard permitting positive manual operation of the handle at all times.

2. The combination with a faucet having a longitudinally movable valve-stem, and a manually actuated operating handle pivotally mounted on the faucet casing, said handle having its free end downturned in front of the casing and connected with the valve-stem, combined with a guard mounted loosely on the said end of the handle and having a protective head in front of such part of the handle and spaced therefrom, said head taking up the impact of a knock or blow and preventing transmission thereof to the handle.

3. The combination with a faucet having a longitudinally movable valve-stem, and a rocking handle having a depending end in front of the casing and connected with the valve-stem to operate the same, of a guard comprising a spindle loosely mounted in the depending end of the handle, and an enlarged head on the outer end of the spindle in front of and spaced from the handle, said head taking up a knock or blow and protecting the handle therefrom, the movement of the head toward the handle being limited by engagement of the inner end of the spindle with the casing of the faucet.

4. The combination with the valve-chamber of a faucet, a longitudinally movable valve-stem projecting therefrom, and an operating handle mounted to rock on said chamber and having one end depending in front of it and connected with the valve-stem, of a guard movable with and also relatively to the depending end of the handle and having a disk-like head in front of and spaced from the handle, to protect the latter from a knock or blow, the inward movement of the guard if struck being limited by engagement thereof with the valve chamber, the head of the guard at such time being maintained fixed a short distance from the front of the handle.

5. The combination with a faucet having a valve-stem and a manually actuated handle pivoted on the casing and connected at one end with the valve-stem, to open and close the faucet, of a guard having a disk-like head in front of the end of the handle connected with the valve-stem, and means to maintain the head at all times spaced from the adjacent part of the handle, to prevent opening movement of the latter by an accidental blow.

6. The combination with a faucet having a valve-stem and a manually actuated handle pivoted on the casing and connected at one end with the valve-stem, to open and close the faucet, of a guard comprising a spindle loosely mounted to move longitudinally in the handle adjacent its connection with the valve-stem, a disk-like head on the outer end of the spindle and always spaced from the handle, to protect the latter from an accidental knock or blow, and means to prevent rotative movement of the spindle and head.

In testimony whereof, I have signed my name to this specification, in the presence of two subscribing witnesses.

THEODORE G. STRATER, JR.

Witnesses:
 JOHN C. EDWARDS,
 FREDERICK S. GREENLEAF.

Copies of this patent may be obtained for five cents each, by addressing the "Commissioner of Patents, Washington, D. C."